United States Patent [19]

Hill

[11] Patent Number: 5,053,095

[45] Date of Patent: Oct. 1, 1991

[54] METHOD FOR CONSTRUCTING A WHEEL AND LOW PROFILE SOLID RUBBER TIRE

[76] Inventor: Giles Hill, Highway 70 East; P.O. Box 809, Idabel, Okla. 74745

[21] Appl. No.: 472,590

[22] Filed: Jan. 30, 1990

Related U.S. Application Data

[62] Division of Ser. No. 228,982, Aug. 15, 1988, Pat. No. 4,966,212.

[51] Int. Cl.⁵ .................. B29D 30/02; B60C 7/24
[52] U.S. Cl. .................. 156/112; 156/123; 152/302; 152/402
[58] Field of Search ............... 152/157, 302, 303, 310, 152/309, 308, 315, 318, 323, 328, 329, 402, 454; 156/110.1, 112, 113, 123, 130

[56] References Cited

U.S. PATENT DOCUMENTS 1,424,134  7/1922  Litchfield ................... 156/112
2,882,950  4/1959  Grove ....................... 152/302

Primary Examiner—Michael W. Ball
Assistant Examiner—Gregory J. Wilber
Attorney, Agent, or Firm—John W. Montgomery

[57] ABSTRACT

A wheel and tire assembly with a solid rubber tire for use on heavy construction equipment. The assembly comprises a mounting disc, a large diameter rim, having a cylindrical surface, rigidly affixed to the mounting disc and having actually opposed peripheral sides. Cross rib means are rigidly fastened to and laterally extending across the cylindrical surface. There are side support means rigidly affixed to and radially projecting from each peripheral side of the cylindrical rim surfaces. A base layer of even thickness of substantially flat rubber is cemented to the cylindrical surface interposed between the cross ribs and the side supports. Multiple additional layers of even thickness substantially flat sheet rubber are bonded to the base layer and each succeeding additional layer of even thickness substantially flat sheet rubber is bonded to the preceding additional layer until a low profile solid rubber tire is obtained, which tire is bonded directly to the large diameter rim.

10 Claims, 2 Drawing Sheets

METHOD FOR CONSTRUCTING A WHEEL AND LOW PROFILE SOLID RUBBER TIRE

This application is a division, of application Ser. No. 228,982, filed Aug. 5, 1988, now U.S. Pat. No. 4,966,212.

FIELD OF THE INVENTION

This invention relates to heavy equipment wheel assembly and method of forming same, and particularly to a non-slip wheel rim having a "flat-proof" solid rubber low profile tire formed thereon.

BACKGROUND OF THE INVENTION

In the construction industry which uses heavy rolling equipment, the time, expense and loss of production resulting from punctured pneumatic tires or "flats" can be substantial. In some instances, standard pneumatic tires have been filled with fluid rubber, elastomeric or a urethane foam material which solidifies in the tire to avoid flats and the down time associated with repairing and reinflating the tires. This has not been found to be totally satisfactory because the standard pneumatic tires have a very large capacity for such elastomeric foam or solidifying rubber so that the weight of such tires is substantially increased thereby reducing the usable power of the heavy equipment as well as substantially increasing wear and tear on the equipment.

In the past, solid rubber has been used on some types of rolling equipment having low torque requirements or small diameter tires, such as trucks or forklifts. Solid rubber tires for larger equipment have not been acceptable because of the large rotational weight resulting from very massive solid rubber tires. Also, means for preventing slippage of the tires with respect to the rims in high torque applications has proved to be inadequate for heavy construction equipment. While such prior solid rubber tires for a forklift used in a smooth cement floor wearhouse environment may be satisfactory, it is unacceptable in rough terrain high torque situations.

Solid rubber tires of the type depicted in Smith Patent No. 2,896,687 have been devised in which an extruded resilient rubber cushion core is encased in a correspondingly formed extrusion of abrasion-resistant stock rubber. Smith teaches encasing a metal band between a base strip of hard rubber and the extruded resilient rubber and abrasion resistant stock. The entire assembly is vulcanized to provide surface to surface binding. The purpose of the metal band is to provide adequate tension between oppositely angled, separable tapered flanges of the wheel rim. When the two halves of the wheel are fastened together, the tapered flanges force the base layer outwardly against the metal band to provide tension between the tire and the wheel surface in an attempt to reduce slippage between the tire and rim. This construction has not been found to be totally satisfactory for several reasons, including the expense of extruding various sizes and shapes of resilient core material and correspondingly shaped abrasion resistant exterior stock material. Further, mere radial tension created between the wheel tapered flange portions and the base strip which is backed up by a metal band is not adequate to avoid slippage in many high torque installations. Further, without observance of close tolerances, the tension may be too great or too little when the halves of the wheel are fully tightened. Further, the vulcanization process does not always result in adequate attachment or bonding between the internal metal band and the various rubber extrusions.

SUMMARY OF THE INVENTION

The instant invention relates to a lightweight wheel and tire assembly and method of forming such an assembly for advantageous replacement of pneumatic wheel and tire assemblies presently used on heavy construction equipment. The assembly comprises, a large cylindrical rim to which a solid rubber cylindrical tire base portion is cemented. Rotational slip is reduced by forming the wheel rim with cross ribs projected from the cylindrical wheel rim into the rubber tire base portion. The cylindrical tire base comprises one or more layers of sheet rubber of substantially even thickness, with each layer of rubber bonded to the next layer. Additional layers of sheet rubber are applied to build up the tire to the desired thickness. In situations where the novel assembly replaces a pre-existing polyurethane foam-filled pneumatic type wheel and tire assembly the diameter of the inventive cylindrical rim is larger than the pre-existing rim which it replaces. The thickness of the solid rubber is much less than the previous thickness of the pneumatic type tire. The weight of the instant assembly is substantially less than the weight of prior wheel and tire assemblies.

In some situations where greater flexibility is required, a cylindrical tire core portion is bonded to the tire base portion. The cylindrical core comprises multiple layers of relatively soft resilient rubber sheets with each layer bonded to the next. There are two cylindrical side portions on either side of the cylindrical core portion with each cylindrical side portion comprising multiple layers of hard wear resistant rubber corresponding in number of layers to the multiple layers of soft core rubber. Each side portion layer is bonded to the next and it is also bonded to the correspondingly adjacent soft rubber layer. An exterior tire portion is bonded across the cylindrical surface formed by the hard rubber side portions and soft rubber core portion. The exterior tire portion comprises one or more layers of hard wearresistant rubber, each layer being bonded to the next. To avoid slip of the tire in the axial direction, the cylindrical wheel rim further comprises angularly opposed side rim portions on either side of the cylindrical tire base portion.

The method of constructing a wheel and low profile solid rubber tire assembly for use on heavy construction vehicles, equipment, or the like, comprises several steps. A large wheel rim is formed having a substantially flat cylindrical rim surface. The rim is attached to a means for mounting the rim to the heavy construction vehicles, equipment, or the like. There are side support means affixed angularly disposed outwardly from the cylindrical rim surface and there is cross rim means fastened laterally extending across the cylindrical rim surface. A base layer composed of even thickness substantially flat sheet rubber is cemented directly to the cylindrical rim surface interposed between the cross rib means and the side support means. Multiple additional layers of eve thickness substantially flat sheet rubber is bonded to the base layer and in turn to each succeeding additional layer until a desired low profile solid rubber tire thickness is obtained.

In an alternative method a wheel and solid rubber tire assembly is formed having the hard rubber exterior portion and the relatively softer rubber interior core comprises several steps. A wheel rim is formed having a cylindrical surface and means rigidly affixed radially inwardly from the cylindrical surface for mounting said rim to the heavy construction equipment; side rims are affixed angularly disposed outwardly from either end of said wheel rim cylindrical surface. At least one cross rib and preferably multiple cross ribs are securely fastened to the exterior wheel cylindrical surface extending substantially from one side rim portion to the other side rim portion. A layer of hard rubber is cemented to the exterior of the cylindrical surface interposed between the cross rib and, in the case of multiple cross ribs, between each of said multiple cross ribs having a radial thickness corresponding to that of said cross rib or cross ribs, as the case may be, and extending in the axial direction substantially coterminous with said side rim portions so that a second cylindrical surface is produced over the top of the first cylindrical surface. A second layer of hard rubber is bonded to the second cylindrical surface substantially coterminous with the side rims so that a third cylindrical surface results overlaying the previous cylindrical surface. Two hard rubber edge layers are bonded at either edge of said third cylindrical surface and a central softer layer is bonded to the central portion of said third cylindrical surface and between and substantially abutting and bonded to each of said hard edge layers such that said hard edge layers and said softer central layer result in a fourth cylindrical surface. Additional hard edge and soft central layers are bonded one at a time to each succeeding overlaying cylindrical surface to form another cylindrical surface. A continuous exterior layer of hard rubber is bonded to the preceding cylindrical surface to form the tread portion of the tire. One or more additional exterior layers may be bonded to the resulting exterior layer.

Thus, a low profile wheel and tire assembly is provided which is flat proof which is low in weight, which is durable, which is flexible, which is formed directly on a strong rim, and which is constructed with ribs and side supports to prevent tire slip, either in the axial or in the rotational direction. The layer by layer solid rubber construction of the instant assembly provides advantages of low cost, high efficiency and adaptability of methods of forming solid rubber tire assemblies heretofore known.

BRIEF DESCRIPTION OF THE DRAWINGS

These and other objects and advantages of the instant invention may be had by referring to the following specification and drawings in which like numerals indicate like components and in which.

DETAILED DESCRIPTION OF THE DRAWINGS

Figure 2:
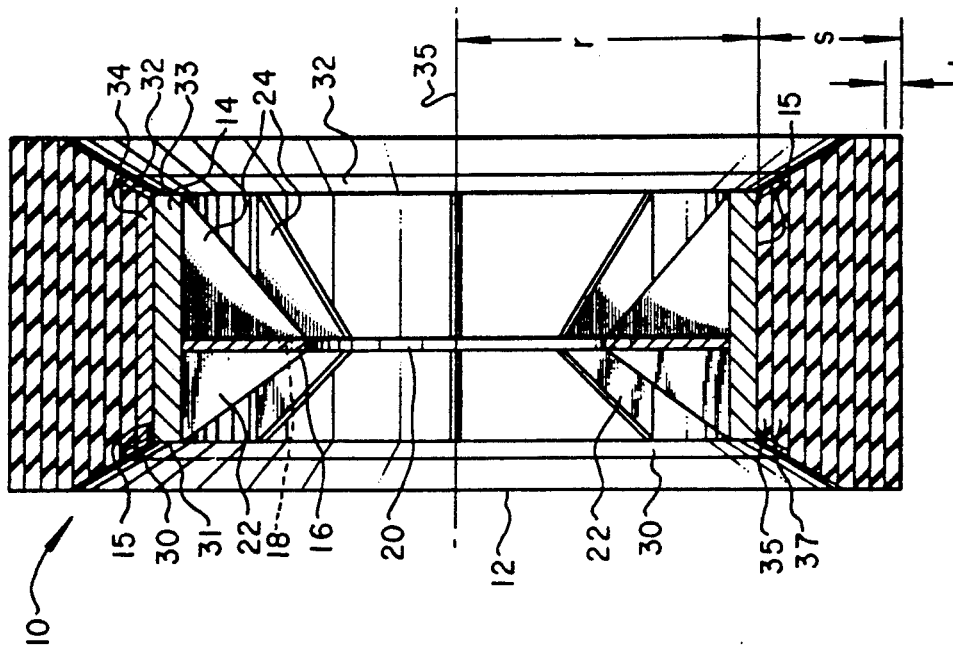
FIG. 2 is a cross-sectional view of the wheel and tire assembly of FIG. 1 taken along section lines II—II.
Figure 1:
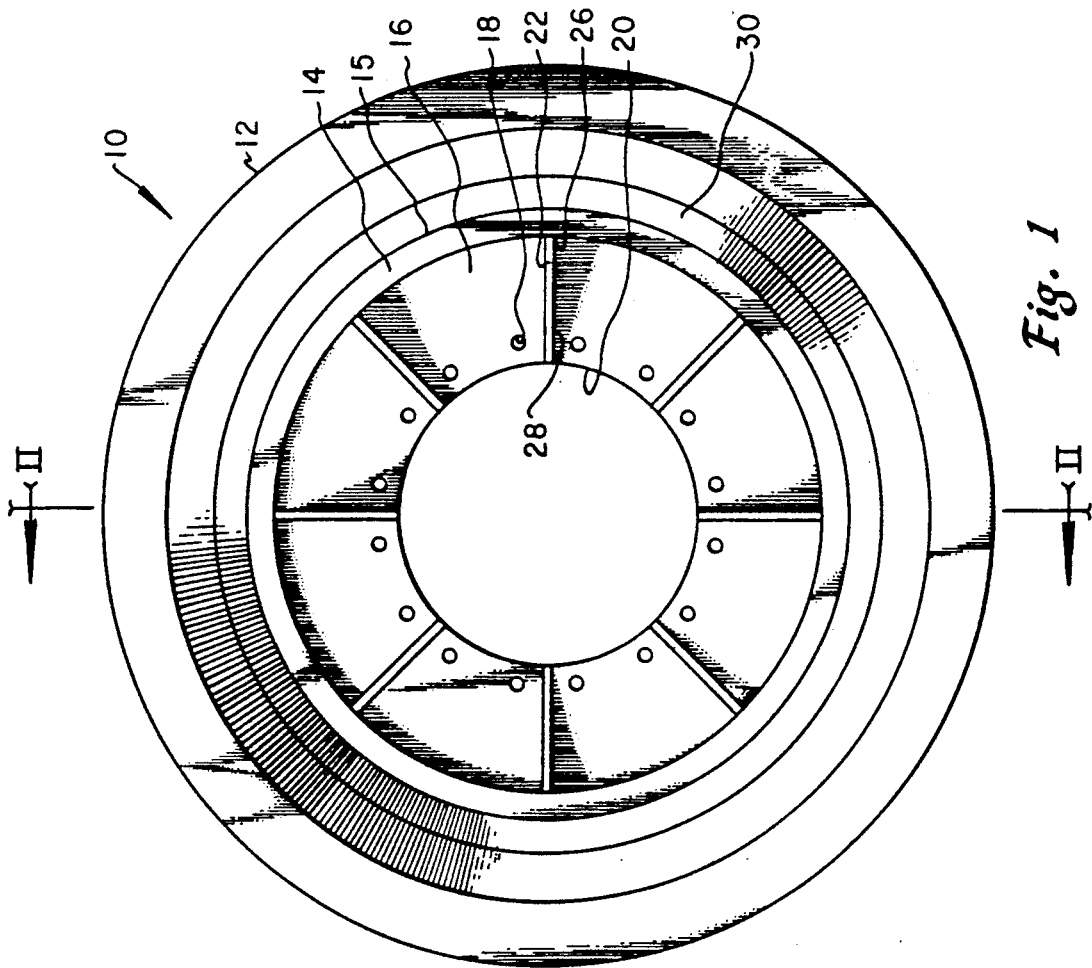
FIG. 1 is a side plan view of the inventive wheel and tire assembly.
Figure 3:
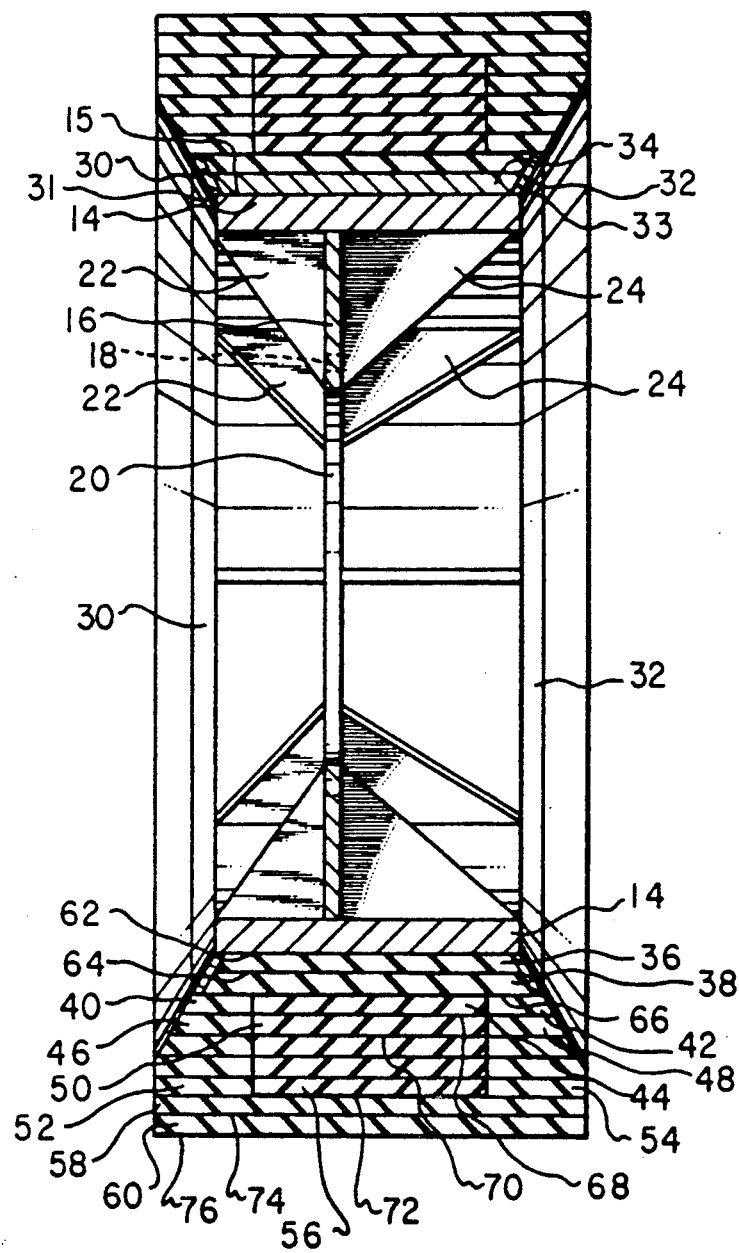
FIG. 3 is a cross sectional view of an alternative embodiment of the wheel and tire assembly of the present invention.

FIG. 1 shows a side plan view of the inventive wheel and tire assembly 10. The solid rubber tire 12, the construction of which will be explained in detail below, is formed directly on cylindrical rim 14. In the preferred embodiment cylindrical rim 14 is a large metal cylinder formed of steel or aluminum or other suitable substantially rigid material. The cylindrical rim 14 is rigidly affixed to mounting means 16 which in the preferred embodiment, as may be further understood with reference also to the cross-sectional views of FIG. 2 and FIG. 3, is a flat disc having attachment means 18 such as bolt holes, lug nut holes, threaded studs or the like attachment means. Also, an axle orifice 20 is defined by the mounting disc 16 so that adequate axle clearance is provided or alternatively where a hub exists on the construction equipment for which the tire assembly is made orifice 20 may be made in a size for corresponding fit on such hub.

With reference again to FIG. 1 in conjunction with FIG. 2 or FIG. 3 rigidifying braces 22 on one side and 24 on the other side are used for added strength where mounting means 16 is a flat disc. The cylindrical rim 14 is thus rigidly fastened to the mounting mean 16 with fastening means 26 and 28 which in the case of metal rim 14 and metal mounting disc 16 comprises horizontal weld 26 and radial welds 28. A side support means 30 on one side and an opposed side support means 32 on the other side are attached radially and outwardly projecting from the cylindrical surface 15 of rim 14. With reference to FIGS. 2 or 3, it can be understood that side support 30 projects radially outwardly from side 31 of cylindrical surface 15 and side support 32 projects radially outwardly from side 33 of cylindrical rim surface 15. In the preferred embodiments as shown in FIGS. 2 and 3 side supports 30 and 32 also project outwardly in opposed axial directions such that opposed partial conical surfaces or angular surfaces are formed with respect to cylindrical surface 15. Such construction advantageously serves to focus the compression force on tire 12 directly on to rim 14 thereby enhancing traction between cylindrical surface 15 and tire 12.

FIG. 2 is a cross section of the wheel and tire assembly of FIG. 1 taken at section lines II—II, the construction of the instant wheel and tire assembly can be further understood. Such construction can advantageously be made with large wheels measuring at least 24 inches (61 centimeters) in diameter such that radius r measured from axis 35 to cylindrical surface 15 will be at least 12 inches (30.5 centimeters). The desired thickness s of tire 12 will depend upon the application involved. For weight-saving purposes thickness s will be in the range of between 15 and 30 percent of the rim diameter 2r.

As indicated previously, side supports 30 and 32 project outwardly from rim surface 15. The rim is also provided with cross rib means 34 which project outwardly from surface 15. In the preferred embodiment cross rib means 34 are bars of rigid material affixed to surface 15 and in the case of metal rim 14 this affixation could be accomplished by welding corresponding metal bars 34 to surface 15. The cross rib means 34 preferably includes multiple bars evenly spaced around the circumference of rim surface 15 and extend laterally between side supports 30 and 32.

A base layer 35 of solid rubber composed of even thickness substantially flat sheet rubber is cemented to cylindrical rim surface 15 interposed between the cross rib means 34 and the side support means 30 and 32. Multiple additional layers 37 of even thickness substantially flat sheet rubber are bonded to the base layer and to each succeeding additional layer until the desired low profile solid rubber tire thickness s is obtained. In the preferred embodiment, the thickness t of layers 35 and multiple layers 37 is approximately ⅝"(1.6 centimeters). Also, in the preferred embodiment cross rib means 34 or bars 34 project a distance equivalent to about 1 t to 2 t.

While there are several ways to obtain substantially even thickness continuous sheet rubber having a width corresponding to that of cylindrical rim 14, the preferred method is to obtain a milled strip of solid rubber from a rubber mill such as Kobe Mill. Such a mill mixes a composition rubber having the desired wear flexibility and hardness characteristics. Substantially even thickness continuous sheets of rubber are provided at an elevated temperature (about 75° F.) which is below the vulcanization temperature (typically about 280° F.). This temperature is sufficiently high to facilitate complete bonding between each layer.

To minimize slippage and maximize adhesion between the base layer of rubber and a metal wheel rim, the wheel rim is prepared for bonding using adhesion enhancement techniques as sandblasting or etching, application of cleaning and/or curing chemicals and application of rubber to metal cement. It has been found that an acceptable procedure for complete and high torque resistant bonding of rubber to metal such as that provided by the Lord's Company of Penna. in which multiple chemical coatings are applied according to the instructions provided by the Lord's Company. The bonding of this procedure is enhanced with sheet rubber at temperatures of about 175° F. Between the base layer 35 and each additional layer 37, a rubber cement, such as a rubber spray cement produced by Bandage, Inc., is applied as by spraying such cement between each additional layer 37. Again, even thickness sheet rubber which is obtained from a sufficiently elevated temperature of about 175° F. has been found to result in complete and thorough bonding. To assist in this bonding, application of mechanical pressure and working small portions of each rubber layer from the center area toward the sides, which mechanical working is know as "sewing" the rubber, is used to expel any potentially trapped air pockets and to thoroughly bond each rubber layer to the preceding layer.

In various applications it may be desirable to obtain a solid rubber tire having additional flexibility yet retaining adequate durability and wear resistance. In such instances, an alternative embodiment of an inventive wheel and tire assembly as shown in FIG. 3 is provided for use on heavy construction vehicles, rolling equipment and the like. Again, the assembly comprises a mounting disc 16 and a rim 14 having a cylindrical surface 15 rigidly affixed to the mounting disc and having side support means 30 and 32 fastened to the rim and projecting radially outwardly from the cylindrical surface 15 at either side of 31 and 33 thereof. At least one cross rib 34 is securely fastened to the cylindrical rim positioned inwardly from the side support means 30 and 32, and projecting a predetermined distance outwardly from cylindrical surface 15. A base tire portion 36 composed of a relatively hard rubber, such as rubber composition having hardness which is in the range of about 60-70 durometer as measured on the Scores A scale, is cemented to the cylindrical rim surface.

A middle tire portion composed of varied hardness rubber with relatively hard (between about 60-70 durometer) side portions and a relatively softer (between about 45-55 durometer) central portion. The middle tire portion is bonded to the base tire portion. An exterior tire portion 58 composed of relatively hard (60-70 durometer) rubber is bonded to the middle tire portion. As may be further understood with reference to FIG. 3, the base portion may be composed of an additional hard rubber layer 38 which is bonded to base layer 36. The middle portion comprises a hard strip of rubber 40 forming a side layer 40 on one side of the tire with a hard sheet strip of rubber 42 forming a side layer 42 on the other side. The soft central layer 44 is interposed and bonded between the side layers 40 and 42. Preferably each layer is "sewn" to the preceding layer and the abutting portions of the hard side layers 40 and 42 are sewn to the abutting portions of soft central layer 44.

A second hard side layer 46 and 48 in conjunction with second soft central layer 50 can be applied and additional varied hardness middle tire portion layers can be likewise applied. Final hard side layers 52 and 54 with the final soft central layer 56 are bonded to the preceding layer. Then a continuous sheet of hard rubber outer layer 58 is applied. Additional hard outer layers or the tread layers are applied to the tire. It being noted that each time a "soft layer" is used in the preceding explanation, a rubber composition having a measured hardness at room temperature in the range of 45-55 durometer is intended while each time "hard layer" is used, a solid rubber having 60-70 durometer measured hardness at room temperature is intended.

As discussed previously, the metal cylindrical surface 15 is preferably prepared for rubber to metal bonding in the manner which provides good adhesion. To the cylindrical surface 64, which results in the preferred embodiment from the hard rubber layer 36 as well as the exposed portions of metal rib means 34, a rubber-to-rubber cement is applied for the application of the next layer. Likewise, the hard rubber cylindrical surface 66 as well as cylindrical surfaces 68, 70, 72 and 74 have rubber-to-rubber cement applied to them prior to wrapping each succeeding sheet of rubber thereon. Each sheet of rubber is cut to a length corresponding to the circumferential distance around each underlying cylindrical surface 64, 66, 68, 70, 72 and 74. The final exterior surface, or what might be known as the tread surface, is not coated with the rubber-to-rubber cement; but, rather, as desired a traction tread or grooling may be formed in such exterior layer. Thus, the soft rubber material is entirely encased by harder rubber material. The disclosed alternative embodiment has been found to provide adequate flexibility and sufficient durability to withstand the high torque operating conditions for most heavy construction equipment, while providing adequate flexibility for use upon construction site terrain.

In the preferred embodiment, the diameter of the wheel rim is substantially larger than the normal pneumatic tire rim for use on equivalent machinery, thus the nominal outside tire diameter is achieved with a low profile solid rubber tire. This substantially reduces the rotating weight of such a hard rubber tire compared to a flat proof tire as may be formed by filling the ordinary pneumatic tire with urethane or polyurethane foam or other flexible solidifying rubberlike material. In the preferred embodiment, the wheel rim diameter is greater than 65% of the overall wheel and tire diameter.

Thus, a low profile wheel assembly with flat proof solid rubber tire for use in high torque heavy construction equipment applications has been disclosed. Likewise, the method for forming such an assembly has been disclosed.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What I claim is:

1. A method of constructing a wheel and low profile solid rubber tire assembly for use on heavy construction vehicles or equipment and said method comprising the steps of:
   (a) forming a large wheel rim having a substantially flat cylindrical rim surface;
   (b) forming means attached to said rim for mounting said rim to said heavy construction vehicles, equipment;
   (c) affixing side support means angularly disposed outwardly from said cylindrical rim surface;
   (d) fastening cross rib means laterally extending across said cylindrical rim surface;
   (e) cementing a base layer composed of even thickness substantially flat hard sheet rubber to said cylindrical rim surface interposed between said cross rib means and said side support means; and
   (f) bonding multiple additional layers of even thickness substantially flat sheet rubber to said base layer and to each succeeding additional layer until a desired low profile solid rubber tire thickness is obtained.

2. A method of constructing a wheel and low profile solid rubber tire assembly as in claim 1 wherein said step of forming a large wheel rim further comprises forming said wheel rim with a diameter measuring at least about 24 inches.

3. A method of constructing a wheel and tire assembly as in claim 2 wherein said step of bonding multiple additional layers to each succeeding layer is discontinues when the desired low profile tire thickness is between about 15 percent and 30 percent of the rim diameter.

4. A method of constructing a wheel and tire assembly as in claim 1 wherein said step of fastening cross rib means laterally extending across said cylindrical surface further comprises fastening multiple bars evenly spaced circumferencially about and radially projecting from the cylindrical surface of said rim with each bar substantially parallel to the central axis of said cylindrical rim surface and each bar extending substantially from one peripheral end of said rim surface to the other peripheral end of said rim surface.

5. A method of constructing a wheel and tire assembly as in claim 1 wherein said step of affixing side support means angularly disposed outwardly from said cylindrical rim surface further comprises the steps of:
   (a) forming two substantially continuous partial conical shaped surfaces;
   (b) affixing one of said two substantially continuous partial conical shaped surface projecting radially and axially outwardly from one peripheral end of said cylindrical rim surface; and
   (c) affixing the other substantially continuous partial conical shaped surface projecting radially and axially outwardly from the other peripheral end of said cylindrical rim surface such that each conical shaped surface is at an opposed angle with respect to the other.

6. A method of constructing a wheel and tire assembly as in claim 1 wherein said cylindrical rim is formed of metal and said step of cementing a base layer of sheet rubber to said cylindrical rim surface further comprises the steps of:
   (a) obtaining a substantially even thickness continuous sheet of rubber having a width corresponding to that of said cylindrical rim;
   (b) cutting said sheet of rubber to lengths corresponding to the circumferential distance between said cross rib means;
   (c) treating said cylindrical rim surface for applying high strength rubber to metal cement; and
   (d) cementing said cut sheet of rubber to said treated rim cylindrical surface with high strength rubber to metal cement.

7. A method of constructing a wheel and tire assembly as in claim 6 wherein the step of bonding multiple additional layers of sheet rubber to said base layer and to each succeeding additional layer further comprises the steps of:
   (a) obtaining succeeding sheets of even thickness rubber each having a width equal to or progressively larger than the preceding sheet;
   (b) cutting each sheet to a length corresponding to the circumference of each bonded preceding layer;
   (c) applying rubber to rubber cement between each layer and to the ends of each layer; and
   (d) wrapping each cut length of sheet rubber to the next for bonding to the preceding layer and for bonding end-to-end.

8. A method of constructing a wheel and tire assembly as in claim 7 wherein said steps of obtaining a substantially even thickness sheet rubber and of obtaining succeeding sheets of even thickness rubber further comprises obtaining such sheets of rubber at temperatures sufficiently elevated to assist rubber-to-rubber bonding yet below vulcanization temperature for such rubber and applying said sheets while at said sufficiently elevated temperature to assist complete bonding.

9. A method of constructing a wheel and tire assembly as in claim 8 further comprising the steps of:
   (a) sewing each layer to the presiding layer by mechanically working with applied pressure from the middle toward the sides to remove any trapped air; and
   (b) sewing each of the ends of each layer together by mechanically working each end into the other with applied pressure.

10. A method of forming a wheel and solid rubber tire assembly having a hard exterior layer and a relatively soft interior core; said method comprising the steps of:
   (a) forming a metal wheel rim having a substantially flat exterior cylindrical surface, having means for mounting said wheel rim to a vehicle, and having side support means angularly disposed outwardly from either end of aid cylindrical surface;
   (b) securely fastening multiple cross ribs to said exterior of said substantially flat cylindrical surface extending substantially from one side support to the other;
   (c) cementing a layer of hard rubber to said exterior cylindrical surface interposed between each of said multiple cross ribs and substantially coterminous with said side support means so that a second cylindrical exterior surface results;
   (d) cementing two side layers of hard rubber at either side of said second exterior surface;
   (e) cementing a central softer layer to said second exterior surface and between and substantially abutting and cemented to said hard side layers such that said hard side layers and softer central layer result in a third exposed cylindrical surface;
   (f) cementing additional hard side layers and soft central layers one at a time until a desired thickness of soft rubber core diameter is achieved thereby resulting in another exposed cylindrical surface;
   (g) cementing a continuous exterior hard layer of rubber to said another exposed cylindrical surface to form the tread portion of said tire.

* * * * *